(12) United States Patent
Formico et al.

(10) Patent No.: US 8,845,118 B2
(45) Date of Patent: Sep. 30, 2014

(54) ILLUMINATION SYSTEM AND METHOD

(75) Inventors: Karen Formico, Mequon, WI (US);
Jeffery Charles Emmerich, Madison, WI (US)

(73) Assignee: Broan-NuTone LLC, Hartford, WI (US)

( * ) Notice: Subject to any disclaimer, the term of this patent is extended or adjusted under 35 U.S.C. 154(b) by 247 days.

(21) Appl. No.: 13/292,759

(22) Filed: Nov. 9, 2011

(65) Prior Publication Data

US 2013/0114244 A1 May 9, 2013

(51) Int. Cl.
| | | |
|---|---|---|
| F21V 33/00 | (2006.01) | |
| A01M 1/04 | (2006.01) | |
| A01M 29/12 | (2011.01) | |
| F21V 15/01 | (2006.01) | |
| A01M 1/20 | (2006.01) | |
| F21S 9/03 | (2006.01) | |
| F21S 9/02 | (2006.01) | |
| F21Y 101/02 | (2006.01) | |
| F21W 131/10 | (2006.01) | |
| F21Y 103/00 | (2006.01) | |

(52) U.S. Cl.
CPC ............. *A01M 1/2077* (2013.01); *A01M 29/12* (2013.01); *F21V 33/006* (2013.01); *F21S 9/03* (2013.01); *F21S 9/02* (2013.01); *F21Y 2101/02* (2013.01); *F21W 2131/10* (2013.01); *F21V 15/01* (2013.01); *A01M 1/2044* (2013.01); *F21Y 2103/00* (2013.01)
USPC ................................. 362/96; 362/253; 43/113

(58) Field of Classification Search
USPC ........ 362/96, 253; 43/113; 239/44; 340/573.2
See application file for complete search history.

(56) References Cited

U.S. PATENT DOCUMENTS

| | | | | |
|---|---|---|---|---|
| 5,647,164 A | * | 7/1997 | Yates | 43/139 |
| 5,799,436 A | * | 9/1998 | Nolen et al. | 43/112 |
| 5,857,769 A | * | 1/1999 | Beggs | 362/294 |
| 6,033,212 A | * | 3/2000 | Bonnema et al. | 431/344 |
| 6,854,208 B1 | * | 2/2005 | Chuang et al. | 43/125 |
| 6,968,124 B1 | | 11/2005 | Varanasi et al. | |
| 7,503,668 B2 | * | 3/2009 | Porchia et al. | 362/161 |
| 8,371,740 B2 | * | 2/2013 | Pestl et al. | 362/643 |
| 2006/0123694 A1 | | 6/2006 | Welch | |
| 2007/0236912 A1 | | 10/2007 | Porchia et al. | |
| 2008/0066372 A1 | | 3/2008 | Fleming | |

FOREIGN PATENT DOCUMENTS

| | | |
|---|---|---|
| JP | 2002159880 A | 6/2002 |
| KR | 1020080074402 A | 8/2008 |

OTHER PUBLICATIONS

WIPO Search Report and Written Opinion dated Mar. 18, 2013 for corresponding Application No. PCT/US2012/063726.

* cited by examiner

*Primary Examiner* — Peggy Neils
(74) *Attorney, Agent, or Firm* — Schwegman Lundberg & Woessner, P.A.

(57) ABSTRACT

Embodiments of the invention provide an illumination system including an outer housing. The outer housing can include at least one inlet and at least one outlet. An inner housing can be coupled to the outer housing and can include fluid apertures and a chamber. An evaporator system can be disposed within the chamber so that the evaporator system is not visible from a position outside of the outer housing. The illumination system can also include an illumination device coupled to the outer housing.

20 Claims, 12 Drawing Sheets

ILLUMINATION SYSTEM AND METHOD

BACKGROUND

Some illumination systems can provide lighting for outdoor activities, however, some pests, such as mosquitoes, moths, other insects, some mammals, and other potential pests can be attracted to the illumination provided by some systems. Moreover, some outdoor activities, regardless of illumination, can attract at least some of the previously-mentioned pests due to the presence of humans or animals. In order to repel some of these pests, chemicals, such as insect repellent, or other deterrents/repellents can be released. However, some of these chemicals can release undesirable odors or may be undesirable to apply to human skin.

SUMMARY

Some embodiments of the invention provide an illumination system that can include an outer housing. In some embodiments, the outer housing can include an inlet and an outlet. Some embodiments provide an inner housing coupled to the outer housing. The inner housing can include fluid apertures and can define a chamber. In some embodiments, an evaporator system can be disposed within the chamber so that it is not visible from a position outside of the outer housing. In some embodiments, at least one illumination device can be coupled to the housing.

Some embodiments of the invention provide an illumination system including a central housing coupled to a base and an upper housing. In some embodiments, at least one illumination device can be coupled to the base. Some embodiments provide a substantially opaque inner housing coupled to the base and the central housing. In some embodiments, an evaporator system can be coupled to the base and disposed within the inner housing. In some embodiments, the evaporator system can include a reservoir and an evaporator member.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 1:
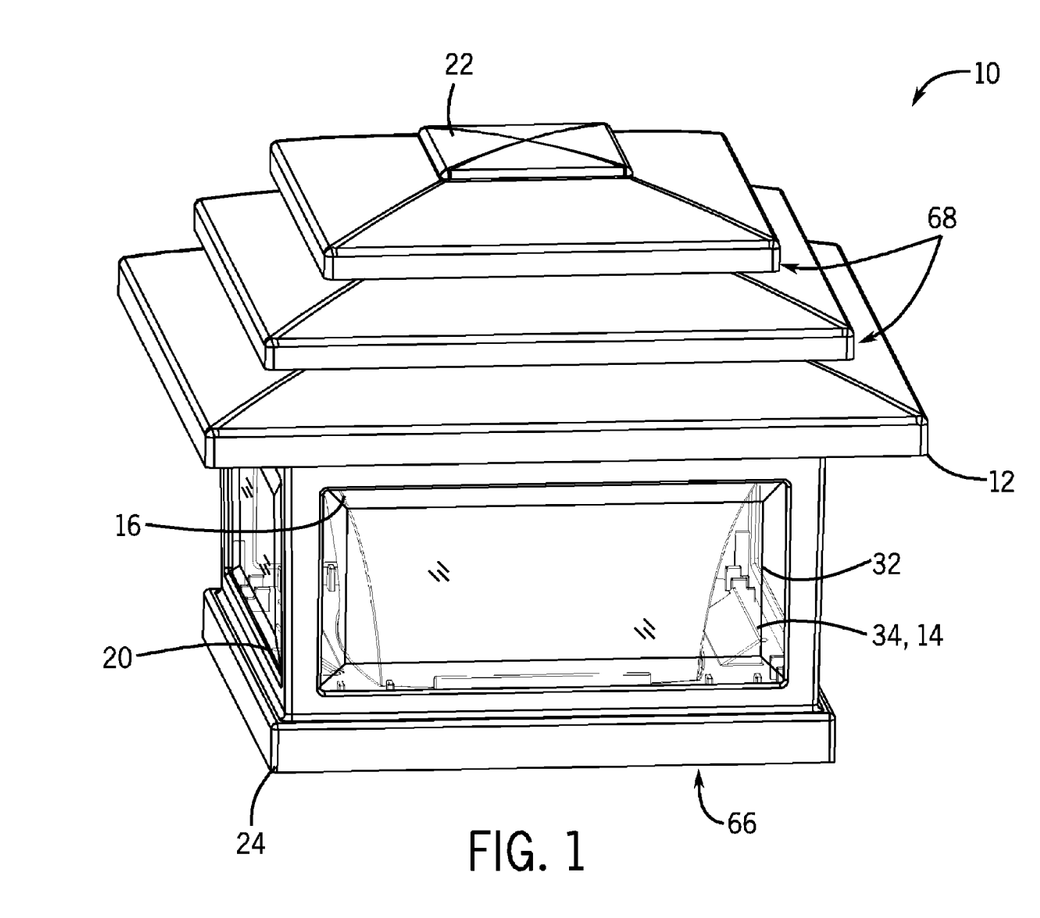
FIG. 1 is a perspective view of an illumination system according to one embodiment of the invention.

FIG. 1 illustrates an illumination system 10 according to one embodiment of the invention. The illumination system 10 can include an outer housing 12, at least one illumination device 14, an inner housing 16, and an evaporator system 18. In some embodiments, at least a portion of the elements of the system 10 can be disposed within, and/or supported by the outer housing 12. Moreover, after assembly, some portions of the outer housing 12 can be substantially fluid resistant or can be configured and arranged to limit fluid influx within the outer housing 12. For example, in some embodiments, a user can employ the illumination system 10 in some outdoor applications. Accordingly, in some embodiments, the illumination system 10 can be configured and arranged to limit an amount of precipitation from entering the outer housing 12 and contacting some elements positioned within the outer housing 12. For example, as described in further detail below, at least a portion of the elements positioned within the outer housing 12 can be operated by an electrical current, and, accordingly, preventing a substantial volume of precipitation from contacting the elements can at least partially reduce risks of short circuit events and other damage to the illumination system 10.

Figure 2:
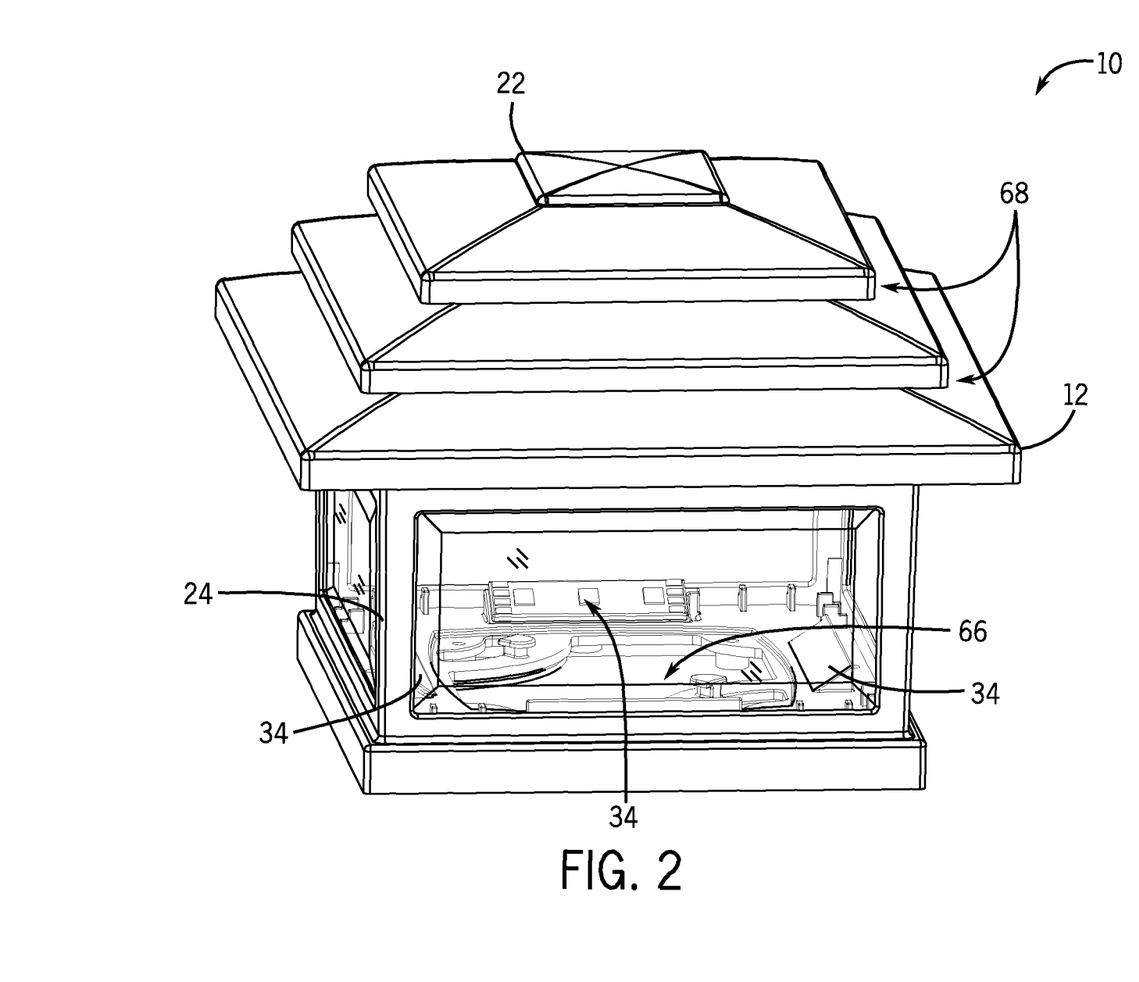
FIG. 2 is a perspective view of an outer housing of the illumination system of FIG. 1.

As shown in FIGS. 1 and 2, in some embodiments, the outer housing 12 can comprise a substantially cubical or square shape. In some embodiments, the outer housing 12 can be configured in other shapes such as spherical, pyramidal, regular or irregular polygonal, or other shapes. In some embodiments, the outer housing 12 can be configured and arranged to take any shape desired by a manufacturer or the user.

In some embodiments, the outer housing 12 can comprise multiple elements. The outer housing 12 can include a base 20, an upper housing 22, and a central housing 24. In some embodiments, the outer housing 12 can be configured so that at least a portion of the outer housing 12 elements are substantially integral with each other. In other embodiments, at least some of the outer housing 12 elements are manufactured separately and later coupled together to form the outer housing 12. Moreover, in some embodiments, the outer housing 12 can comprise multiple materials, such as a metal, an alloy, a polymer, polycarbonate, a resin, a composite, and other materials. Further, in some embodiments, different portions of the outer housing 12 can comprise different materials. For example, in some embodiments, the central housing 24 can comprise a metal-containing material and the base 20 can comprise a polymer or polycarbonate. In some embodiments, each portion of the outer housing 12 can comprise substantially similar materials.

Figure 3A:
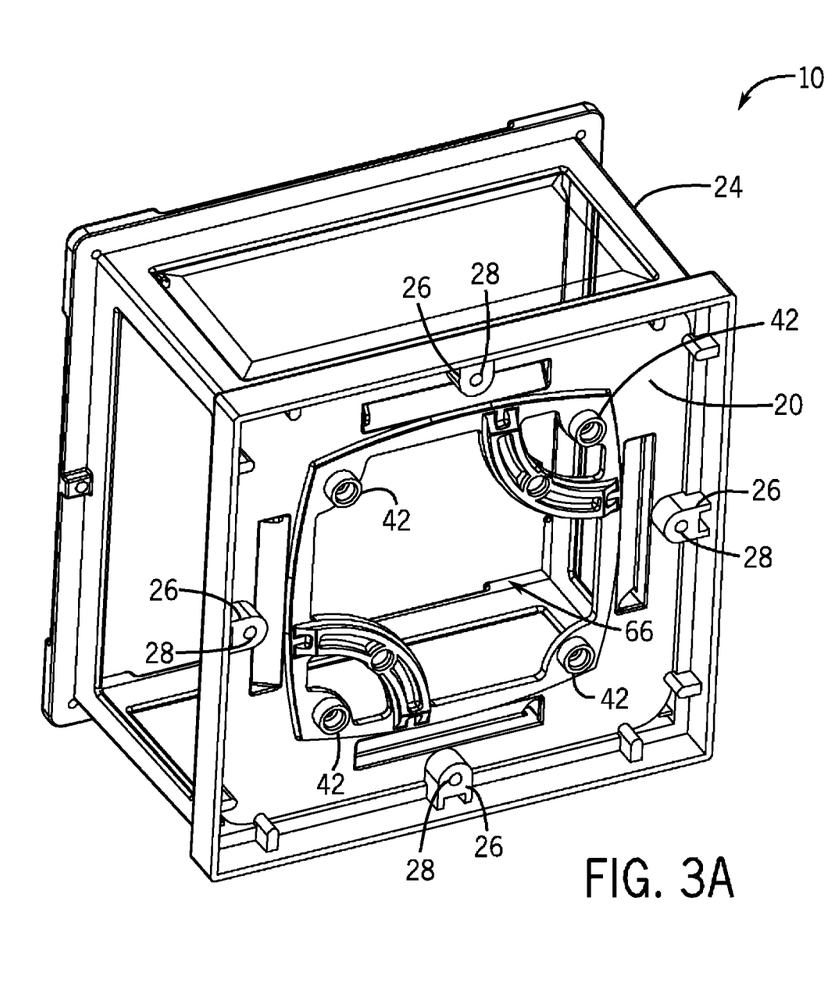
FIG. 3A is a bottom perspective view of a portion of the outer housing of the illumination system of FIG. 1.
Figure 3B:
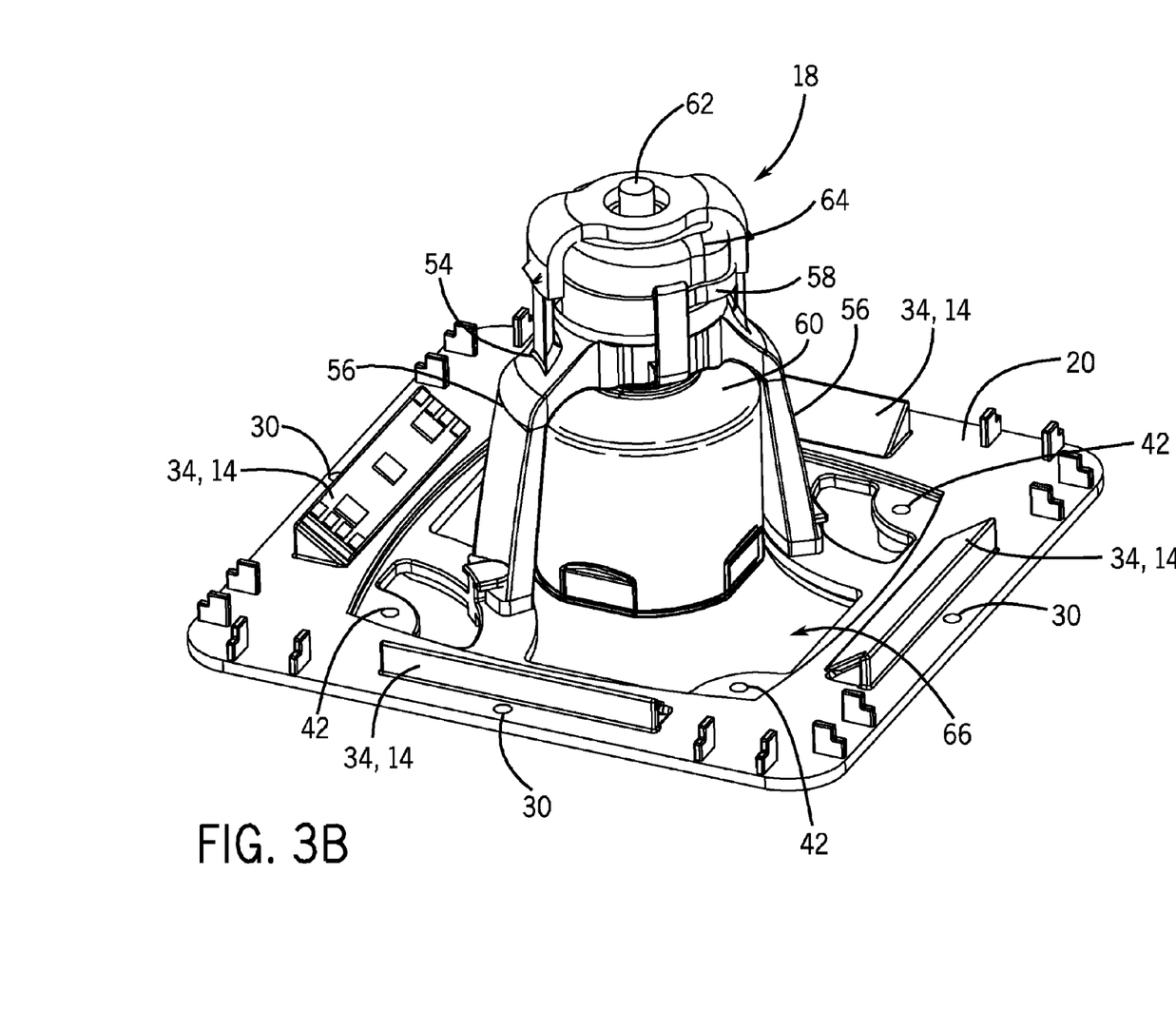
FIG. 3B is a perspective view of a portion of an illumination system according to one embodiment of the invention.

In some embodiments, the base 20 can be coupled to the central housing 24, as shown in FIG. 3A. In some embodiments, the central housing 24 can comprise four substantially similar sides (e.g., a substantially square configuration) and each of the four sides can comprise at least one flange 26 extending inward. At least some of the flanges 26 can comprise a coupling aperture 28 that can be configured and arranged to receive at least one coupling structure (e.g., a screw, a nail, a fastener, adhesive, etc.). In some embodiments, the central housing 24 can be dimensioned so that the base 20 can be disposed within the central housing 24 and can be supported and retained in position by one or more of the flanges 26. Moreover, in some embodiments, the base 20 can comprise receiving apertures 30, as shown in FIG. 3B. For example, in some embodiments, the base 20 can be configured and arranged so that when the base 20 can be coupled to the central housing 24, the receiving apertures 30 and the coupling apertures 28 can substantially align so that a coupling structure (not shown) can be disposed through the apertures 28, 30 to aid in coupling together the base 20 and the central housing 24. In other embodiments, as previously mentioned, the base 20 and the central housing 24 can be substantially integral so that no coupling is necessary.

Figure 4A:
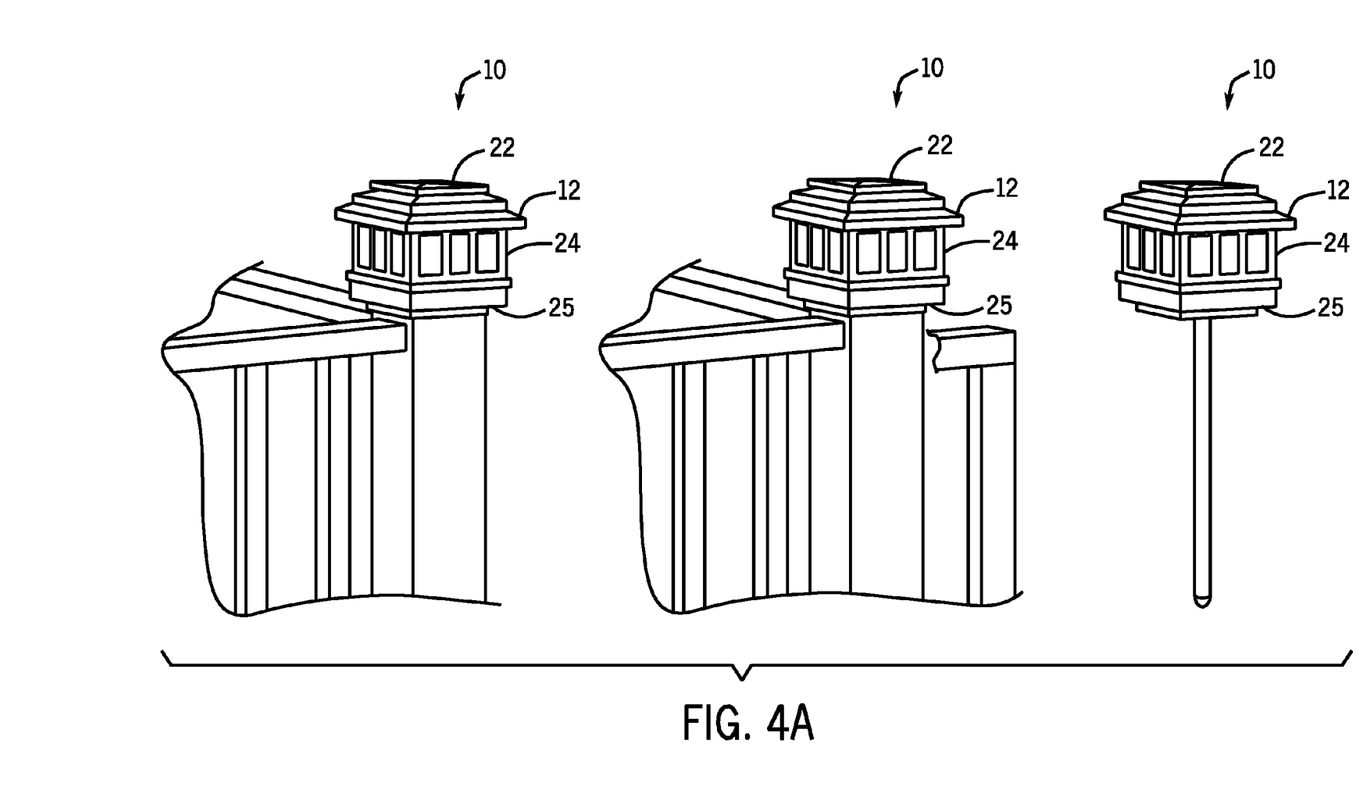
FIG. 4A is perspective views of the illumination system of FIG. 1 coupled to different adapters.
Figure 4B:
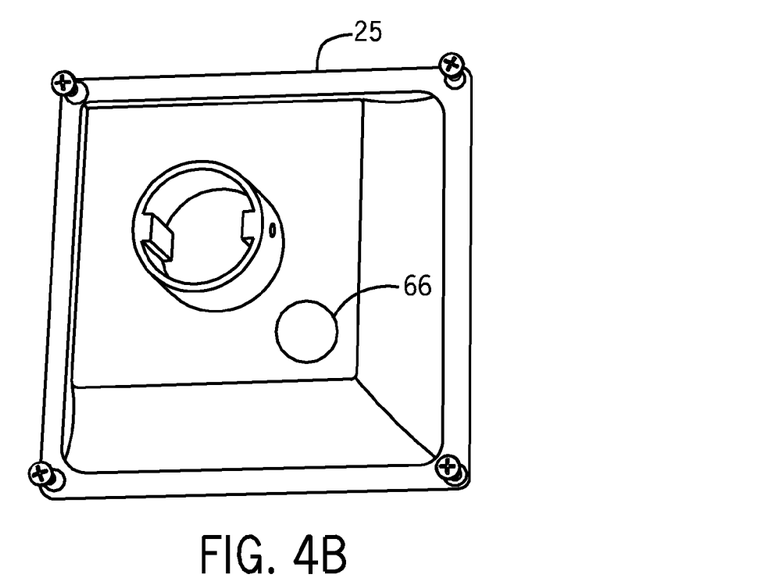
FIG. 4B is a bottom view of an adapter according to one embodiment of the invention.

In some embodiments, the outer housing 12 can comprise an adapter 25. Referring to FIGS. 4A and 4B, the adapter 25 can be coupled to the base 20 and/or the central housing 24 to enable versatile positioning of the illumination system 10. In some embodiments, the adapter 25 can comprise multiple configurations and/or the outer housing 12 can be configured and arranged to be coupled to multiple adapters 25. For example, as shown in FIG. 4A, multiple adapters 25 can be coupled to the outer housing 12 so that the illumination system 10 can be coupled to structures of multiple sizes (e.g., multiple circumferences, perimeters, areas, volumes, etc.). By way of example only, the adapter 25 can be configured to receive a substantially cylindrical support structure, a support post including a first size, a support post including another, different size. In some embodiments, the adapter 25 can be configured and arranged to receive any structure so that the illumination system 10 can be supported by, and coupled to, a relatively stable structure in any location (e.g., a fence post, a support post for a deck, a support for a patio, etc.).

Figure 5:
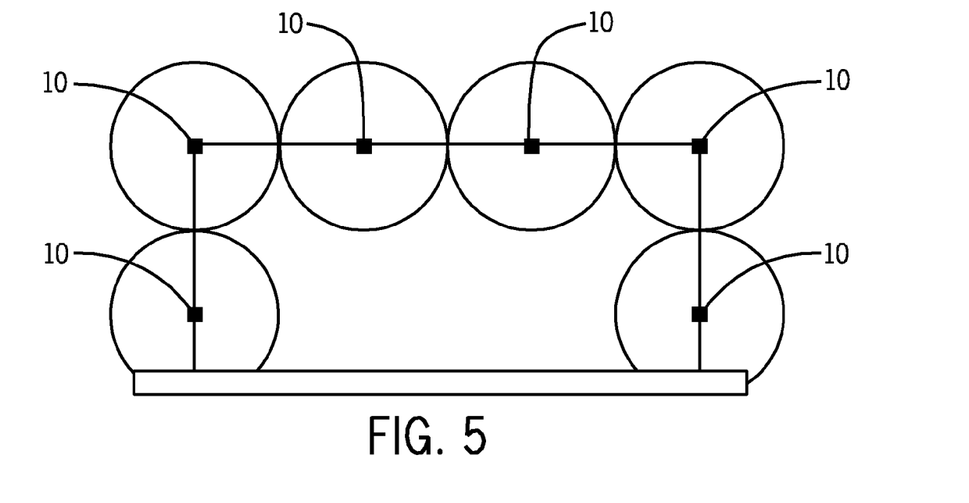
FIG. 5 is a diagram representing a plurality of illumination systems according to one embodiment of the invention.

As shown in FIG. 5, in some embodiments, a plurality of illumination systems 10 can be coupled to multiple support structures. By way of example only, as shown in FIG. 5, multiple illumination systems 10 can be coupled to the support posts around at least a portion of a perimeter of a gathering area (e.g., an outdoor/indoor patio, deck, entertainment region, any other region where humans or other animals would gather) to provide illumination, pest control, or other desirable benefits, some of which are described in further detail below. Moreover, in some embodiments, the illumination systems 10 can be coupled to the support posts at regular and/or irregular intervals (e.g., a substantially daisy-chained configuration).

In some embodiments, the central housing 24 can comprise a plurality of panels 32. As shown in FIG. 1, in some embodiments, each side of the central housing 24 can comprise at least one panel 32. In some embodiments, the central housing 24 can comprise different numbers of panels 32 relative to sides (e.g., more sides than panels 32 or more panels 32 than sides). Moreover, in some embodiments, at least some of the panels 32 can be substantially transparent and/or substantially translucent. For example, at least a portion of the panels 32 can comprise glass (e.g., any form of glass, such as substantially transparent glass or substantially translucent glass, such as frosted glass), polycarbonate, or other materials through which illumination can be visible to observers. Although, in some embodiments, at least one of the panels 32 can be substantially opaque so that illumination cannot be visible through the panel 32. In some embodiments, at least a portion of the central housing 24 can be uncoupled so that the panels 32 can be installed or replaced within the sides of the central housing 24.

In some embodiments, the illumination device 14 can be coupled to a portion of the outer housing 12. In some embodiments, the illumination system 10 can comprise multiple illumination devices 14 coupled to portions of the outer housing 12. For example, in some embodiments, at least a portion of the illumination devices 14 can be coupled to the base 20. The illumination devices 14 can be coupled to the base 20 at substantially regular intervals. For example, the illumination devices 14 can be disposed substantially adjacent to at least a portion of the panels 32, as shown in FIG. 1. In some embodiments, the base 20 can comprise at least one electrical socket 34 to which illumination devices 14 can be coupled (e.g., installed) for use. Moreover, the illumination devices 14 can be oriented substantially parallel to the panels 32. In some embodiments, the illumination devices 14 can be disposed substantially adjacent to at least some corners of the base 20 and/or the central housing 24. In other embodiments, the illumination devices 14 can be coupled to any other portion of the outer housing 12 desired by the manufacturer or the user.

In some embodiments, the illumination devices 14 can include incandescent, fluorescent, compact fluorescent, halogen, and other lights and lamps. Further, these lights can comprise flood lights, globe lights, light-emitting diodes (LEDs), or other similar lighting apparatuses, including a combination of any of the above. Moreover, in some embodiments, the illumination system 10 can comprise other illumination configurations. For example, in some embodiments, the illumination system 10 can comprise a combination of LEDs and other illumination devices as disclosed in U.S. patent application Ser. Nos. 12/902,077 and 12/902,065. The entire contents of these applications are hereby incorporated by reference in this disclosure. Briefly, the illumination system 10 can comprise the capability to emit illumination at different intensities and at different times. Also, in some embodiments, the system 10 can radiate multiple colors of light at different intensities over a predetermined time period.

In some embodiments, the illumination devices 14 can be electrically coupled to a power source. In some embodiments, the base 20 can be electrically coupled to a generally lowvoltage (e.g., 12 volts) current source such as battery (not shown), a photovoltaic system (not shown), or other current source, such as an alternating current source (e.g., current originating from a structure, such as house or other building). For example, in some embodiments, electrical connections, such as wiring, can be coupled to the illumination devices 14 and/or electrical sockets 34 and routed through some portions of the outer housing 12 (e.g., the adapter 25) to a current source. Moreover, in some embodiments, the battery can be installed within the outer housing 12 or electrically coupled to the illumination system 10. Additionally, in some embodiments, a photovoltaic cell (not shown) can be coupled to the upper housing 22 or other portions of the outer housing 12 to capture any solar energy needed to operate the illumination system 10. Moreover, in some embodiments, the illumination system 10 can comprise any combination of power sources.

Figure 6:
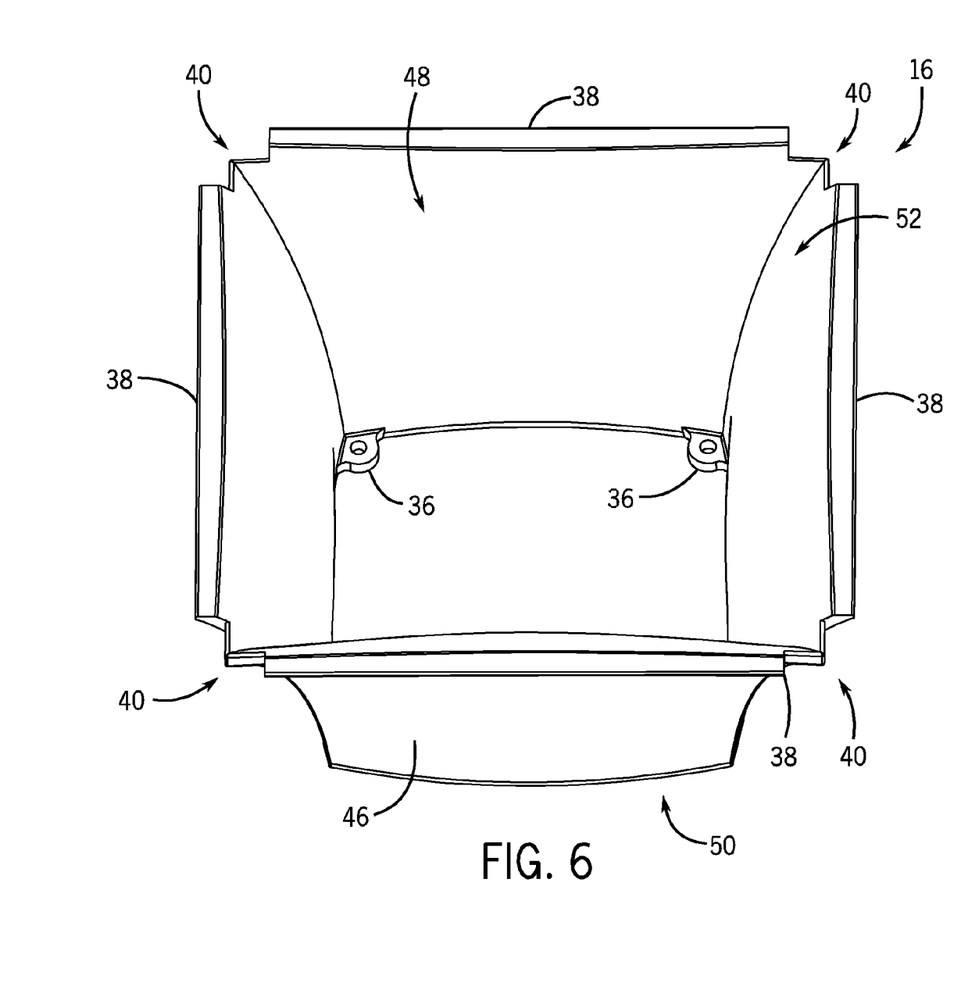
FIG. 6 is a perspective view of an inner housing of the illumination system of FIG. 1.
Figure 7:
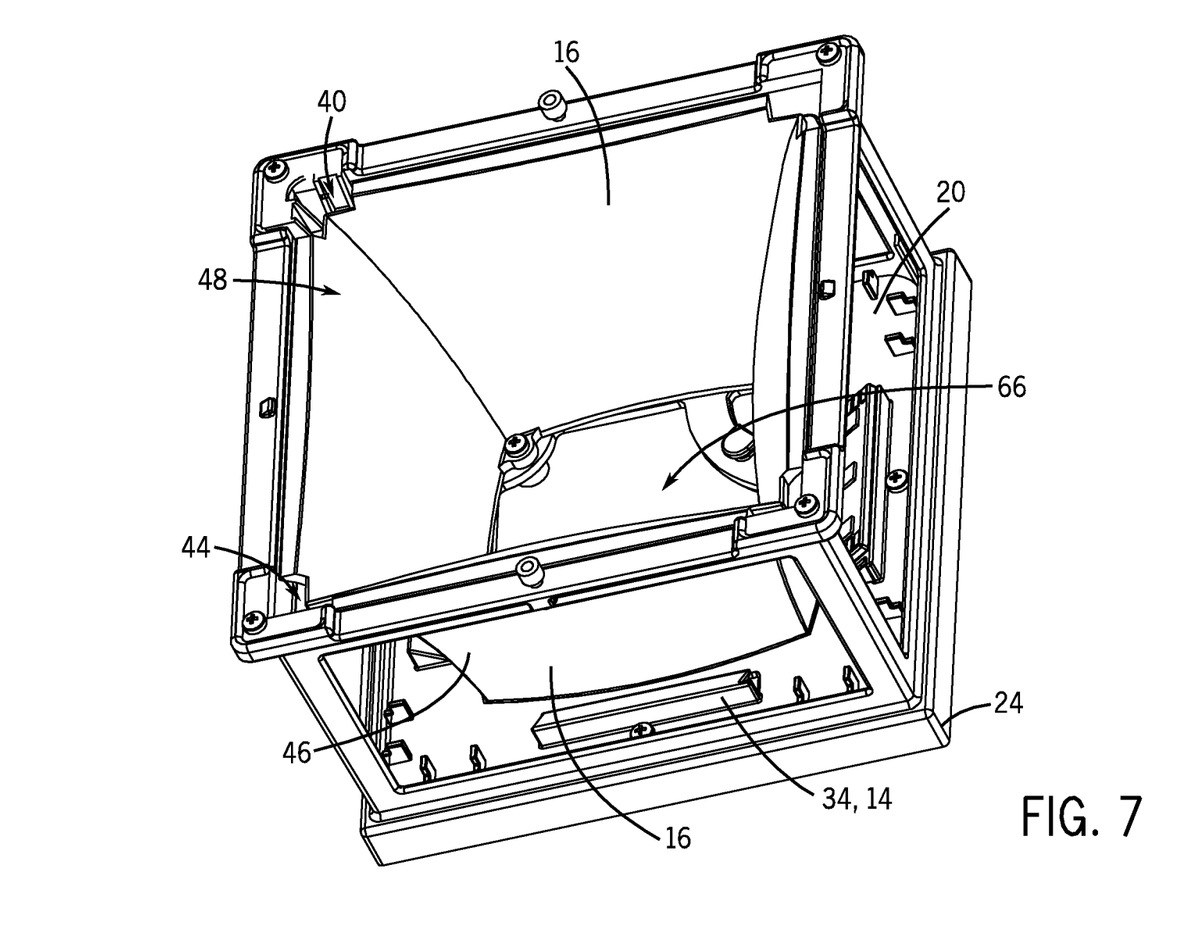
FIG. 7 is a perspective view of a portion of the illumination system of FIG. 1.
Figure 8:
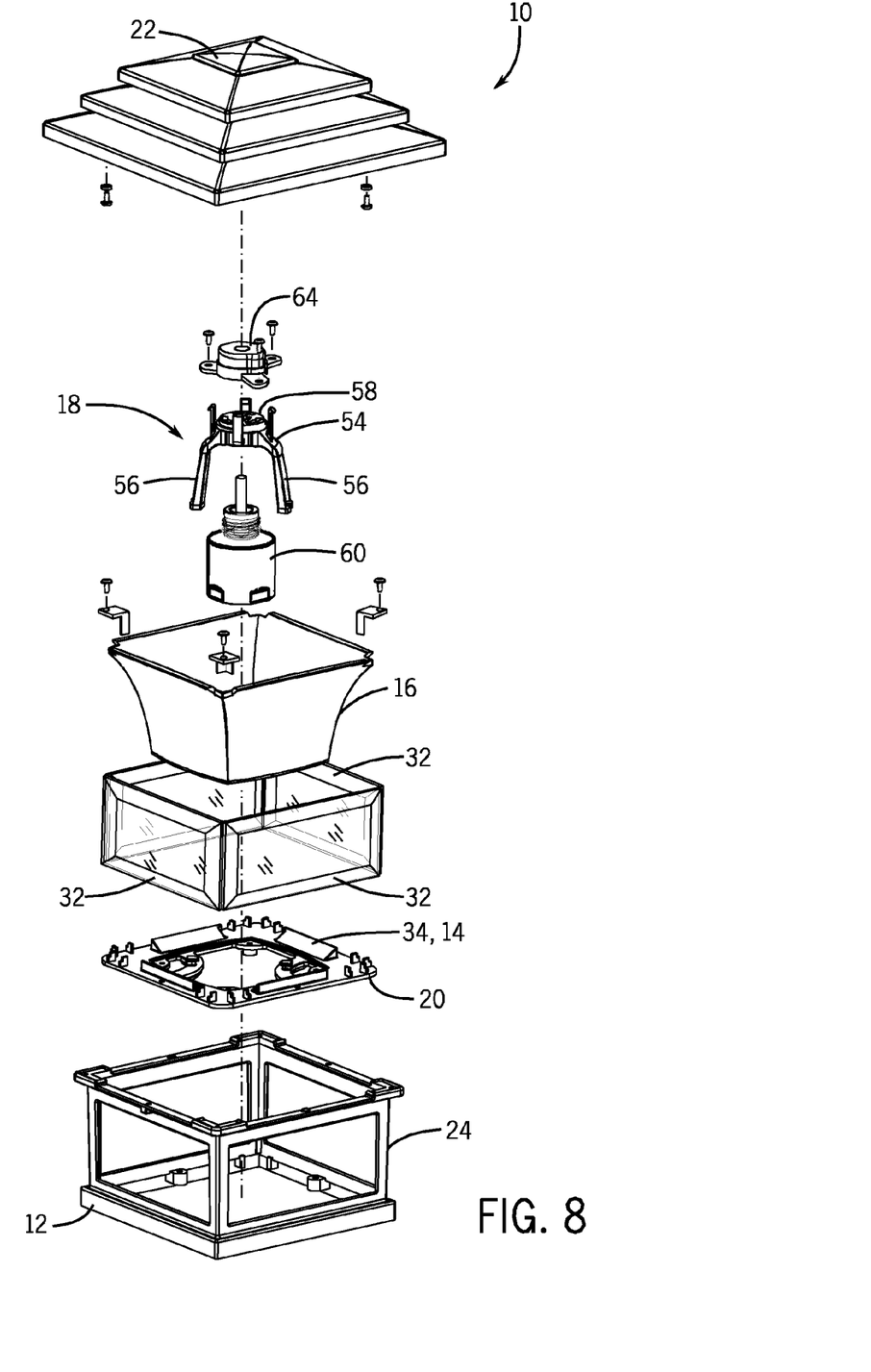
FIG. 8 is an exploded view of an illumination system according to one embodiment of the invention.

In some embodiments, the inner housing 16 can be coupled to the outer housing 12. For example, the inner outer housing 12 can be at least partially disposed within the outer housing 12, as shown in FIG. 1. In some embodiments, the inner housing 16 can be coupled to the base 20 and/or the central housing 24. For example, as shown in FIGS. 6-8, in some embodiments, the inner housing 16 can comprise one or more coupling flanges 36, one or more positioning flanges 38, and one or more positioning recesses 40. Moreover, in some embodiments, the base 20 can comprise one or more receiving apertures 42 and the central housing 24 can include one or guide flanges 44 extending inward from at least some of its sides. Accordingly, in some embodiments, the inner housing 16 can be inserted within the outer housing 12 so that the coupling flanges 36 of the inner housing 16 substantially align with the receiving apertures 42 of the base 20 so that the two elements can be coupled together (e.g., via coupling structures such as adhesives, conventional fasteners, welding, brazing, etc.). Moreover, the guide flanges 44 can at least partially engage the positioning flanges 38 and the positioning recesses 40 can at least partially align with, and engage, upper corners of the central housing 24 to substantially align the inner housing 16 in a desired position (e.g., so that the coupling flanges 36 substantially align with the receiving apertures 42).

In some embodiments, an outer surface 46 of the inner housing 16 can comprise an at least partially reflective surface. For example, the inner housing 16 can be coupled to the base 20 so that one or more of the illumination devices 14 are substantially adjacent to the outer surface 46. As a result, in some embodiments where the outer surface 44 is at least partially reflective, at least a portion of the illumination provided by one or more of the illumination devices 14 can be directed outward (e.g., to an outer environment through one or more of the panels 32). In some embodiments, at least a portion of the outer surface 46 can be substantially non-reflective so that at least a portion of the illumination provided by the illumination devices 14 is not reflected by some portions of the outer surface 46.

In some embodiments, the inner housing 16 can comprise a substantially opaque configuration. For example, the inner housing 16 can be configured and arranged to prevent any light transmission from or to a chamber 48 disposed within the inner housing 16. For example, as described in further detail below, the evaporator system 18 can be at least partially disposed within the chamber 48 so that at least a portion of the evaporator system 18 can be obscured from view.

Furthermore, in some embodiments, the inner housing 16 can comprise a first fluid aperture 50 and a second fluid aperture 52. For example, the first fluid aperture 50 can be substantially immediately adjacent to one or more of the coupling flanges 36 and the second fluid aperture 52 can be disposed at a substantially opposite portion of the inner housing 16 relative to the first fluid aperture 50. In some embodiments, the inner housing 16 can comprise a substantially inverted frusto-pyrimidal configuration so that the first fluid aperture 50 comprises a lesser perimeter relative to the second fluid aperture 52. In other embodiments, the inner housing 16 can comprise other configurations (e.g., cylindrical, cubical, rectangular, etc.) and the first and second fluid apertures 50, 52 can comprise substantially similar perimeters or substantially different perimeters. Additionally, as shown in FIGS. 6 and 8, in some embodiments, at least some sides of the inner housing 16 can comprise substantially angled, bent, or an otherwise non-planar configuration, although, in other embodiments, at least a portion of the sides of the inner housing 16 can comprise a substantially planar configuration.

In some embodiments, the evaporator system 18 can be at least partially disposed within the chamber 48 defined by the inner housing 16. As previously mentioned, by positioning the evaporator system 18 within the inner housing 16, in some embodiments comprising a substantially opaque inner housing 16, the evaporator system 18 can be at least partially obscured from view so that anyone adjacent to the illumination system 10 cannot readily visualize the evaporator system 18. Furthermore, at least some of the fluids or other substances that can be contained within the evaporator system 18 can be at least partially susceptible to ultra-violet radiation (e.g., sunlight). Accordingly, by disposing the evaporator system 18 within the inner housing 16, the evaporator system 18 can be at least partially removed from direct exposure to ultra-violet radiation.

Figure 9:
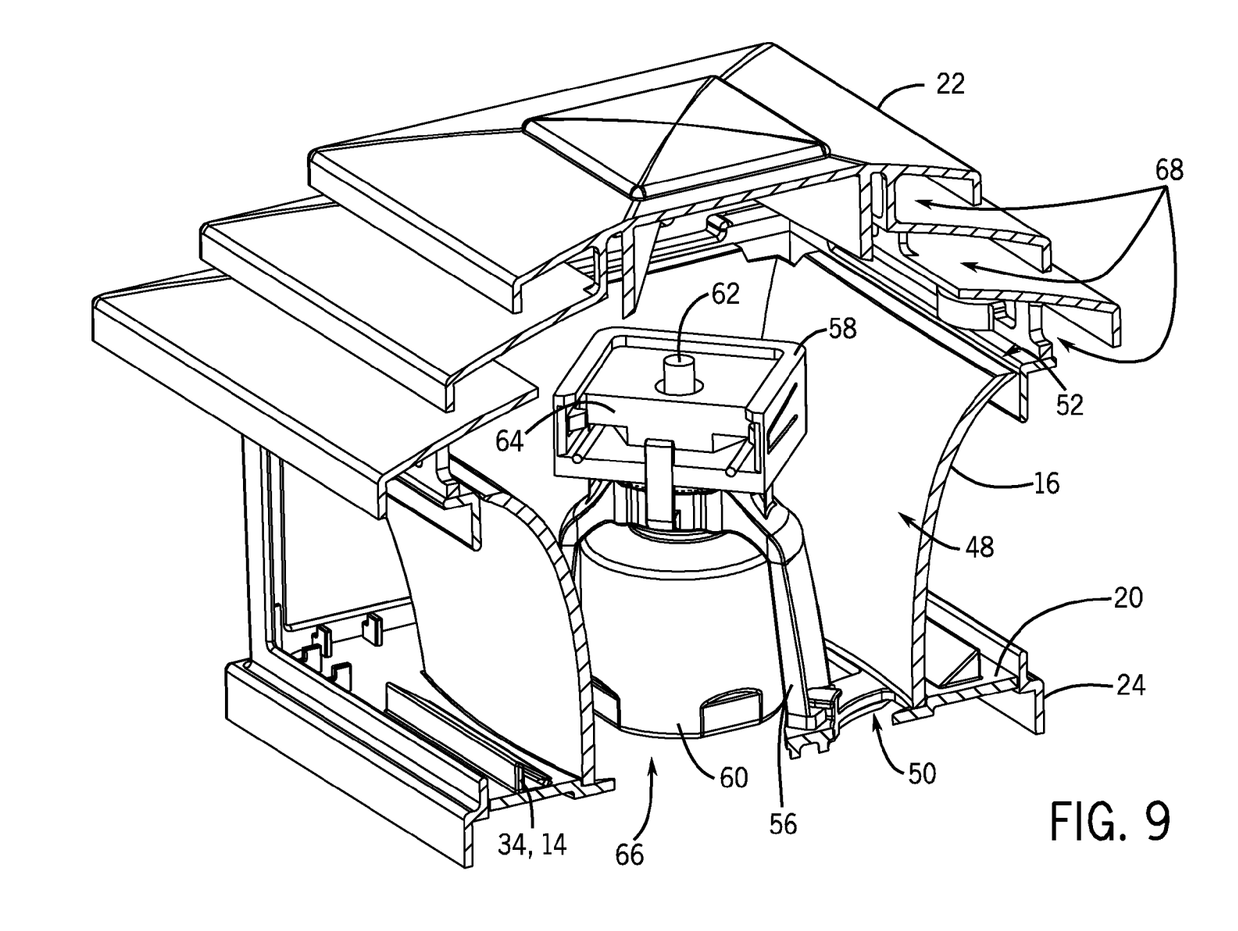
FIG. 9 is a partial cross-sectional view of the illumination system of FIG. 1.

As shown in FIG. 9, in some embodiments, the evaporator system 18 can be at least partially supported by and/or coupled to the outer housing 12. In some embodiments, the evaporator system 18 can comprise a support apparatus 54 that can be configured and arranged to couple together the evaporator system 18 and at least a portion of the base 20. For example, as shown in FIGS. 8 and 9, the support apparatus 54 can include at least two support members 56 and a receiving member 58. In some embodiments, the evaporator system 18 can comprise at least one reservoir 60 (e.g., a bottle or other structure capable of receiving a fluid) and the receiving member 58 and the support members 56 can be configured and arranged to receive the reservoir 60.

By way of example only, in some embodiments, the reservoir 60 can comprise a bottle including a neck portion and the support apparatus 54 can at least partially function to couple the reservoir 60 to the base 20. For example, the receiving member 58 can be disposed over at least some of the neck portion and the support members 56 can be spaced apart to receive the reservoir 60, as shown in FIGS. 8 and 9. In some embodiments, the support members 56 can be coupled to the base 20 via conventional fasteners, adhesives, welding, brazing, and other coupling methods. For example, the support members 56 can be reversibly coupled to the base 20 (e.g., via conventional fasteners) so that the user can access the reservoir 60 (e.g., the user can repeatedly access the reservoir 60 to add a fluid to the reservoir 60). In some embodiments, the reservoir 60 can be directly coupled to the base 20 or other portions of the outer housing 12. Moreover, in some embodiments, more than one reservoir 60 can be either directly coupled to the base 20 or coupled to the base 20 via multiple support apparatuses 54.

In some embodiments, the reservoir 60 can contain any fluid, mist, liquid, or any other substance. For example, in some embodiments, the reservoir 60 can contain a volatile fluid. By way of further example, in some embodiments, the reservoir 60 can comprise a volatile liquid that can include one or more pest-affecting substances, fragrances, deodorization substances, air sanitizers, aromatherapy substances, volatile medical compounds, or any combination thereof. Further, all references to the term "pest" should be understood to include pests of humans and animals (e.g., insects, rodents, arthropods, any disease-carrying animal or insect, or any other animal generally considered to be a conventional pest).

In some embodiments, the pest-affecting substances can comprise a synthetic substance, an organic substance, a natural substance, and/or any other substance that can affect pest behavior. In some embodiments, the pest-affecting substance can function as a pest repellent, a pesticide (e.g., a compound capable of killing or substantially incapacitating a pest), a pest attractant (e.g., a compound capable of drawing insects near to the illumination system 10), or any other substance capable of being recognized by a pest. For example, in some embodiments, the pest-affecting substance can comprise one or more of permethrin, bifenthrin, prallethrin, allethrin, esbiothrin, tretramethrin, d-tetramethrin, phenothrin, metofluthrin, profluthrin, dimefluthrin, transfluthrin, imiprothrin, empenthrin, dichlorvos, tetfluthrin, phenothrin, cypermethrin, etofenprox, pacardin, n,n-diethyl-m-toluamide, N,N-diethyl-3-methylbenzamide, any pyrethroid-containing compound, any allyl sulfide, garlic oil, garlic paste, garlic emulsion, and any other conventional pest-affecting substance.

Figure 10:
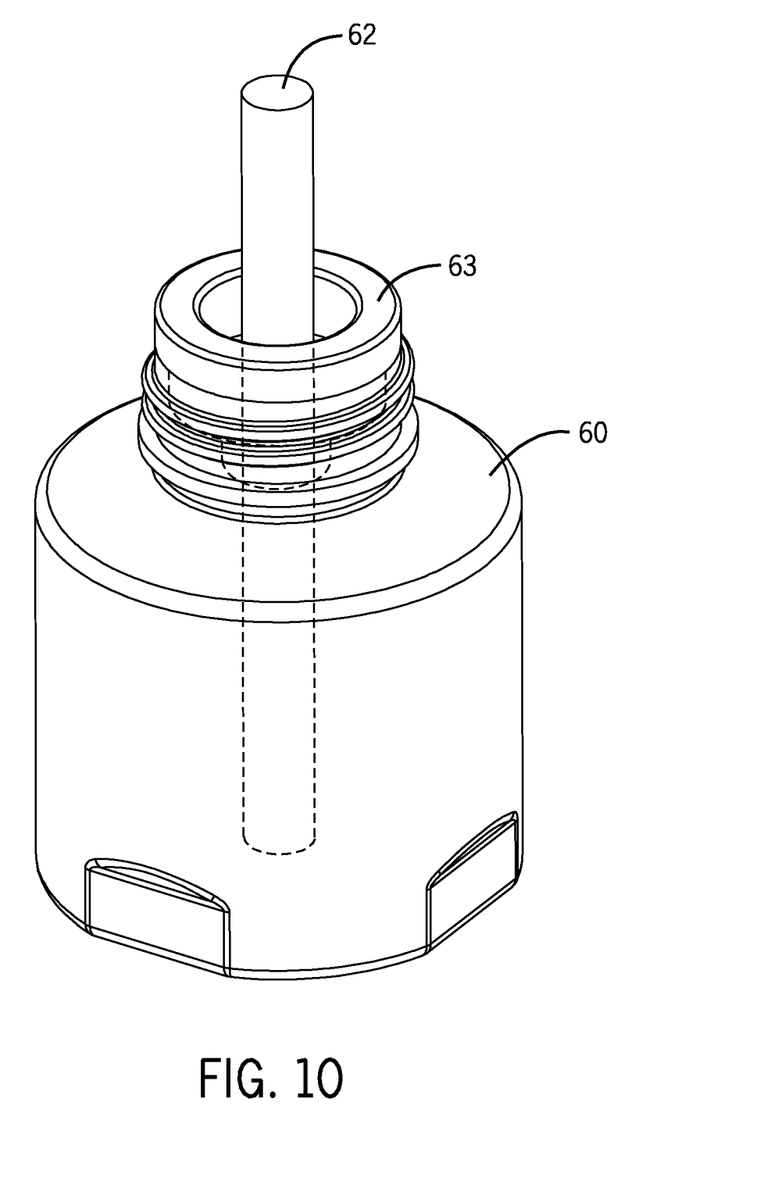
FIG. 10 is a perspective view of a reservoir and wick according to one embodiment of the invention.
Figure 11:
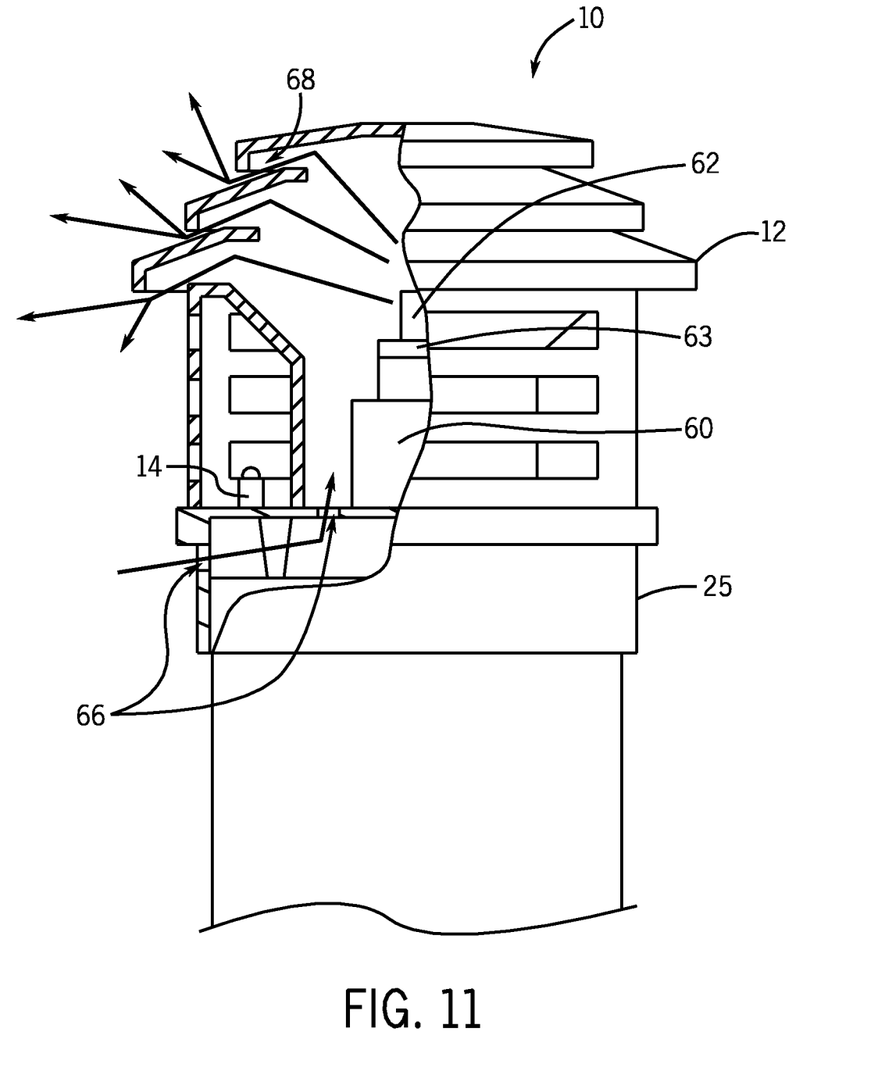
FIG. 11 is a partial cross-sectional view of an illumination system and fluid flow path according to one embodiment of the invention.

In some embodiments, at least one wick 62 can be at least partially disposed within the reservoir 60. As shown in FIG. 10, in some embodiments, the wick 62 can extend at least a length of the reservoir 60. For example, in some embodiments, the wick 62 can comprise a length that is greater than the length of the reservoir 60. In some embodiments, the wick 62 can comprise any substantially absorbent material such as felt, cotton, cloth, pulp, paper, a porous resin (polypropylene foam, urethane foam, etc.), un-woven fabric, asbestos, porous ceramics, synthetic fiber (nylon, polyester, polypropylene, etc.), natural fibers, (wool, silk, cotton, hemp, etc.), inorganic substances, or any combination thereof. In some embodiments, the wick 62 can be configured and arranged to enable transfer of the volatile fluid from within the reservoir 62 to a position outside of the reservoir 60. For example, because the wick 62 can at least partially extend out of the reservoir 60 (e.g., protrude from the neck of the reservoir 60), the wick 62 can function to absorb the volatile fluid within the reservoir 60 and transfer the fluid outside of the reservoir 60 (e.g., via capillary action, diffusion, etc.).

In some embodiments, the reservoir 60 can comprise a wick support structure 63 disposed within an opening of the reservoir 60. For example, as shown in FIG. 10, the wick support structure 63 can be disposed at least partially within the neck portion of the reservoir 60 and can function to support and retain the wick 62 in position during operations of the illumination system 10. Moreover, in some embodiments, the volatile fluid within the reservoir 60 can be expended during operations of the evaporator system 18 and the user can access the reservoir 60 by uncoupling the support apparatus 54 from the outer housing 12 and then removing the wick support structure 63 to add further quantities of the volatile fluid to the reservoir 60. The wick support structure 63 can also function to at least partially seal the reservoir 60 so that the only material amounts of volatile fluid exiting the reservoir 60 do so via the wick 60 and are not subject to significant amount of natural evaporation.

In some embodiments, the evaporator system 18 can comprise an evaporator member 64. In some embodiments, the evaporator member 64 can generally comprise a structure configured and arranged to output thermal energy (e.g., a heater, such as resistance heater). As previously mentioned, the base 20 can be electrically connected to a current source to provide electrical current to the illumination devices 14. In some embodiments, the evaporator member 64 and/or other portions of the evaporator system 18 can be electrically connected to the current source and/or the base 20 so that the evaporator member 64 can output thermal energy when receiving power from the current source.

In some embodiments, the evaporator member 64 can be removably coupled to the evaporator system 18 to volatilize the pest-affecting substance or any other substance within the reservoir 60. For example, in some embodiments, the wick 62 can be disposed within the evaporator system 18 so that it is substantially adjacent to the evaporator member 64. As shown in FIG. 3B, in some embodiments, the evaporator member 64 can be substantially immediately adjacent (e.g., substantially circumscribe) to at least a portion of the reservoir 60 (e.g., within or immediately adjacent to the neck portion of the reservoir 60) and/or a portion of the wick 62. As a result, in some embodiments, the thermal energy produced by the evaporator member 64 can volatilize the substance within the reservoir 60. Further, as the substance volatilizes, further volumes of the substance can be drawn upward through the wick 62 so that the volatile substance can be substantially continuously released by the evaporator system 18 when the evaporator member 64 is activated.

In some embodiments, the upper housing 22 can be coupled to the central housing 24. The upper housing 22 can be coupled to the central housing 24 using conventional coupling technique, such as, but not limited to, conventional fasteners, welding, adhesives, brazing, snap-fittings, grille springs, etc. For example, in some embodiments, the upper housing 22 can be coupled to the central housing 24 via one or more conventional fasteners, such as screws, bolts, and/or nails. Moreover, in some embodiments, the upper housing 22 can be reversibly coupled to the central housing 24 so that a user can easily remove the upper housing 22 to access any elements coupled to, or disposed within, the central housing 24.

In some embodiments, the upper housing 22 can be coupled to the central housing 24 at a position substantially opposed to the adapter 25 and the base 20 (i.e., an upper portion of the illumination system 10). In some embodiments, by coupling the upper housing 22 to the central housing 24 at a position substantially opposite the base 20, the upper housing 22 can substantially enclose some portions of the illumination system 10, such as, but not limited to some or all of the illumination devices 14, the evaporator system 18, the base 20, and some other elements. In some embodiments, the illumination system 10 can be at least partially disposed in an outdoor environment, and the upper housing 22 can function to at least partially reduce the chances of precipitation contacting some of the components of the illumination system 10 that are electrically connected to a current source (e.g., the evaporator system 18, the illumination device 14, etc.).

In some embodiments, the illumination system 10 can comprise at least one fluid inlet 66 and at least one fluid outlet 68. For example, some portions of the outer housing 12 can comprise the fluid inlet 66 and the fluid outlet 68. As shown in FIGS. 4A and 12, in some embodiments, the central housing 24, the adaptor 25, and/or the base 20 can comprise one or more fluid inlets 66. For example, in some embodiments, the adaptor 25 can comprise at least one fluid inlet 66, as shown in FIGS. 4A and 12. Moreover, the base 20 can comprise an inlet 66, in addition to, or in lieu of, the inlet 66 through the adaptor 25. In some embodiments, the upper housing 22 can comprise one or more fluid outlets 68. For example, as shown in FIG. 12, the upper housing 22 can be configured and arranged to include a plurality of fluid outlets 66 in multiple layers extending from a position substantially adjacent to the central housing 24 toward a position substantially distal to the central housing 24. In some embodiments, the upper housing 22 can comprise a different configuration and can comprise a single fluid outlet 68 at a position substantially distal to the central housing 24 (e.g., a top portion of the upper housing 22). In yet other embodiments, the fluid inlets 66 and fluid outlets 68 can be disposed through other portions of the illumination system 10.

In some embodiments, as a result of the positioning of some of the fluid inlets 66 and some of the fluid outlets 68, at least a portion of the fluid that is volatized by the evaporator system 18 can be distributed to the environment around the illumination system 10. As illustrated by the arrows in FIG. 12, when the evaporator member 64 is activated and a fluid (e.g., air) circulates through the fluid inlets 66 disposed through portions of the adaptor 25 and/or the base 20 and the first fluid aperture 50 of the inner housing 16, the fluid can receive portions of the volatized substance (e.g., via diffusion) and can carry the volatized substance through the second fluid aperture 52 of the inner housing 16 and the fluid outlets 68 into the environment. For example, the natural convection process of air passing through the fluid flow path that includes the inlets 66, the fluid apertures 50, 52 and the outlets 68 can pass substantially adjacent to the evaporator system 18 (e.g., the fluid flow path can substantially pass around and/or through portions of the evaporator system 18), which can lead to the air carrying the volatized fluid out of the outer housing 12.

The following description is intended as an example of some operations of the illumination system 10 and is not intended to limit this disclosure. In some embodiments, the illumination system 10 can provide both illumination and protection from some pests. The system 10 can provide illumination or pest protection at any given time. For example, the illumination system 10 can provide illumination only or the illumination system 10 can provide pest protection only. In some embodiments, the illumination system 10 can provide both illumination and pest protection.

As previously mentioned, in some embodiments, the reservoir 60 can contain a pest-affecting substance, such as an insecticide or an insect repellent. The pest-affecting substance can comprise one or more of any of the previously-mentioned substances or any other conventional pest-affecting substance. In some embodiments, the user can activate the evaporator member 64 (e.g., via a switch, remotely, automatically via a timer or some other trigger, etc.) and, because the wick 62, which draws up the pest-affecting substance from the reservoir 60, is substantially adjacent to the evaporator member 64, the evaporator member 64 can volatize at least a portion of the pest-affecting substance disposed on or within the wick 62. Further, air can circulate through the inlets 66 and first aperture 50 and receive at least a portion of the volatized pest-affecting substance and carry it out of the illumination system 10 via the outlets 68. Once outside of the outer housing 12, the air flow can disperse the pest-affecting substance within the local environment (e.g., within fifteen feet of the outer housing 12) to kill and/or repel pests (e.g., mosquitoes, ticks, spiders, etc.).

In some embodiments, a plurality of illumination systems 10 can be combined to provide a substantially pest-free area. As shown in FIG. 5, the illumination systems 10 can be disposed along a perimeter of a desired area (e.g., an outdoor area such as a deck, a patio, or other area capable of human occupation) and each of the illumination systems 10 can produce volatized pest repellent and illumination. In some embodiments, the illumination systems 10 can be disposed a distance apart so that a perimeter of volatized pest repellent released for each of the illumination systems 10 can substantially abut the perimeter of volatized pest repellent released by neighboring illumination systems 10, as represented by the circles shown in FIG. 5. As a result of the substantially continuous perimeter of pest repellent, at least a portion of the pests (e.g., mosquitoes, ticks, spiders, etc.) can be repelled and humans can gather within the perimeter to avoid encounters with the pests. Although FIG. 5 depicts the range of volatized pest repellent as approximately fifteen feet, the illumination system 10 can be configured to produce ranges greater or lesser than fifteen feet (e.g., by modulating the power of the evaporation member 64 when releasing volatized pest repellent). Moreover, the illumination system 10 can also provide illumination for this substantially pest-free area.

Additionally, the illumination system 10 can be configured to provide long-term pest protection. In some embodiments, the reservoir 60 can be configured to contain enough pest repellent for long-term use. For example, the reservoir 60 can be configured to contain about 90 days worth of pest repellent for volatization by the low-voltage evaporator member 64. Accordingly, by providing a reservoir 60 configured to contain a volume of pest repellent that can last for a significant portion of an outdoor season, the user can enjoy the benefits of the illumination system 10 without the need to disassemble the outer housing 12 and the evaporator system 18 to routinely re-fill the reservoir 60.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An illumination system comprising:

an outer housing including a central housing and at least one inlet and at least one outlet;

an inner housing being coupled to the outer housing, the inner housing including a first fluid aperture and a second fluid aperture and defining a chamber;

an evaporator system being disposed within the chamber so that the evaporator system is not visible from a position outside of the outer housing; and a plurality of illumination devices distributed substantially around the evaporator system and being coupled to the outer housing between the inner housing and the central housing to emit illumination outside of the inner housing.

2. The illumination system of claim 1, wherein the evaporator system comprises a reservoir, a wick, and an evaporator member.

3. An illumination system comprising:

an outer housing including at least one inlet and at least one outlet;

an inner housing being coupled to the outer housing, the inner housing including a first fluid aperture and a second fluid aperture and defining a chamber;

an evaporator system disposed within the chamber so that the evaporator system is not visible from a position outside of the outer housing;

at least one illumination device coupled to the outer housing and having at least a portion located outside of the inner housing to emit illumination outside of the inner housing;

wherein the evaporator system comprises a reservoir, a wick, and an evaporator member; and wherein the reservoir contains at least one of a pest repellent or a pesticide.

4. The illumination system of claim 2, wherein the evaporator member is coupled to one of the reservoir and the wick and is configured and arranged to output thermal energy.

5. The illumination system of claim 1, wherein the illumination device comprises at least one of a light-emitting diode, an incandescent bulb, a compact fluorescent bulb, or a halogen bulb.

6. The illumination system of claim 1, wherein the illumination device is configured and arranged to radiate multiple colors of light at different intensities over a predetermined time period.

7. The illumination system of claim 1, wherein the inner housing comprises a reflective outer surface.

8. The illumination system of claim 1, and further comprising an adaptor coupled to the outer housing.

9. The illumination system of claim 1, and further comprising a fluid flow path defined by the inlet, the first fluid aperture, the second fluid aperture, and the outlet.

10. An illumination system comprising:
   a central housing being coupled to a base and an upper housing;
   a plurality of illumination devices being coupled to the base;
   an inner housing being coupled to the base and the central housing, the inner housing being substantially opaque; and
   an evaporator system being coupled to the base, the evaporator system including a reservoir and an evaporator member, and wherein the evaporator system is disposed within the inner housing; and
   wherein the plurality of illumination devices are distributed substantially around the evaporator system and include at least a portion disposed outside of the inner housing between the inner housing and the central housing to emit illumination outside of the substantially opaque inner housing.

11. The illumination system of claim 10, wherein the inner housing comprises a substantially reflective outer surface.

12. The illumination system of claim 11, wherein the illumination device is configured and arranged to emit illumination and is coupled to the base so that at least a portion of the illumination is reflected by the substantially reflective outer surface of the inner housing.

13. An illumination system comprising:
   a central housing being coupled to a base and an upper housing;
   at least one illumination device being coupled to the base;
   a substantially opaque inner housing coupled to the base and the central housing; and
   an evaporator system coupled to the base, the evaporator system including a reservoir and an evaporator member, and wherein the evaporator system is disposed within the inner housing, the at least one illumination device including at least a portion disposed outside of the inner housing to emit illumination outside of the substantially opaque inner housing; and wherein the reservoir contains at least one of a pest repellent or a pesticide.

14. The illumination system of claim 10, wherein the evaporator system comprises at least one wick.

15. The illumination system of claim 10, wherein the upper housing includes at least one fluid outlet, the base includes at least one fluid inlet, and the inner housing includes a first fluid aperture and a second fluid aperture.

16. The illumination system of claim 15, and further comprising a fluid flow path defined by the inlet, the first fluid aperture, the second fluid aperture, and the outlet.

17. The illumination system of claim 16, wherein the fluid flow path passes immediately adjacent to the evaporator system.

18. The illumination system of claim 10, and further comprising an adaptor coupled to at least one of the base or the central housing.

19. A method of assembling an illumination system, the method comprising:
   providing an outer housing including a central housing and at least one inlet and at least one outlet;
   coupling an inner housing to the outer housing, the inner housing including a first fluid aperture and a second fluid aperture;
   disposing an evaporator system within the inner housing so that the evaporator system is not visible from a position outside of the outer housing; and
   positioning a plurality of illumination devices distributed substantially around the evaporator system
   the plurality of illumination devices having at least a portion located outside of the inner housing between the inner housing and the central housing to emit illumination outside of the inner housing.

20. A method of assembling an illumination system, the method comprising:
   providing an outer housing including at least one inlet and at least one outlet;
   coupling an inner housing to the outer housing, the inner housing including a first fluid aperture and a second fluid aperture;
   disposing an evaporator system within the inner housing so that the evaporator system is not visible from a position outside of the outer housing; and
   coupling at least one illumination device to the outer housing, the at least one illumination device having at least a portion located outside of the inner housing to emit illumination outside of the inner housing; and wherein the evaporator system comprises at least one reservoir containing at least one of a pest repellent or a pesticide.

* * * * *